United States Patent Office 3,556,990
Patented Jan. 19, 1971

3,556,990
REVERSE OSMOSIS PURIFICATION OF
HYDROCARBON FUELS
Arnold G. Gulko, 1835 Arcola Ave.,
Silver Spring, Md. 20902
No Drawing. Filed Dec. 5, 1967, Ser. No. 687,972
Int. Cl. B01d 13/00, 13/04
U.S. Cl. 208—290                                    9 Claims

ABSTRACT OF THE DISCLOSURE

Liquid hydrocarbon fuels are purified by forcing the fuel under pressure through a hydrocarbon-insoluble oleophylic film. The liquid hydrocarbon fuel wets the film because the film comprises at least 20% by weight of side chains having a terminal hydrocarbon group containing at least four carbon atoms and the film is rendered insoluble to liquid hydrocarbons by being cross-linked with from 0.5–15% by weight of cross-linking agent. A typical film is constituted by a solution copolymer containing a large proportion of long chain acrylate or methacrylate ester which is cross-linked with divinyl benzene.

---

The present invention relates to the processing of liquid hydrocarbon fuels such as gasoline and fuel oil to remove sulfur compounds, bacteria and other non-hydrocarbon contaminants by utilizing reverse osmosis. In the invention, the liquid fuel is forced under pressure through a film or membrane which is wetted by the hydrocarbon fuel because it comprises long chain hydrocarbon side chains such as occur in a copolymer containing a large proportion of unsaturated ester providing long chain hydrocarbon terminal groups, e.g., a copolymer of 10% ethyl acrylate and 90% 2-ethylhexyl acrylate. The required insolubility of the film in the fuel is provided by cross-linking the copolymer, e.g., by including from 0.5 to 15% by weight of divinyl benzene or the like in the copolymer. The film should be thin, e.g., typically 1 mil or less and air dried or cured under moderate conditions in order to best retain a microporous structure, as is conventional in the production of semi-permeable membranes.

Copolymers made by solution polymerization in an organic solvent are preferred. Appropriate solvents are illustrated by aromatic hydrocarbons such as toluene or xylene. A proportion of alcohol such as propanol or butanol is helpful in order to foster the formation of a microporous film upon deposition and removal of solvent by volatilization.

In accordance with the invention, the film which is used to constitute the semi-permeable membrane is constituted by a liquid hydrocarbon-insoluble resin containing sufficient long chain hydrocarbon side chains to foster wetting by the liquid fuel. Such resins are normally termed "oleophylic" and the proportion of long chain hydrocarbon side chains required for the desired effect will vary with the type of resin and the length of the chains. In preferred practice, these have at least 4 carbon atoms, desirably at least 6 carbon atoms and these side chains per se constitute at least 20%, preferably at least 40% of the weight of the resin.

Liquid hydrocarbon insolubility is also needed since one would not wish the resin film or coating used as the membane to dissolve as the fuel is forced through it under pressure. Ordinary linear thermoplastic polymers are therefore undesirable and a small degree of cross-linking is usually needed to provide the desired hydrocarbon insolubility. This is easily provided in various ways depending upon the type of resin utilized and whether insolubilization is to be predetermined by the resin used or by some cure mechanism to be employed after the film or coating has been deposited, as will be explained more fully hereinafter.

As is conventional in reverse osmosis, the semi-permeable membrane is associated with a porous block and the liquid to be purified is forced under pressure against the membrane while the same is backed up or supported by the porous block. The liquid penetrates the membrane and then moves through the porous block with the contaminants remaining behind in the liquid which has not passed through the membrane. The pressures are usually in the range of from 50–300 atmospheres, but the pressure used is not of overwhelming consideration aside from the fact that some substantial pressure is needed to cause penetration whereas excessive pressure has a disruptive influence on the membrane. Association of the membrane with the porous support may be by coating the membrane on the block or by clamping a preformed film against a surface of the block, as is well known.

The contaminants which exist in hydrocarbon fuels are of various type, much of them either not including long chain hydrocarbon groups or including ester groups or other oxygen-containing groups so as to more strongly resist passage through the oleophylic membrane. As a result, the liquid material which passes through the membrane is significantly upgraded in purity, but the material which does not pass through the membrane becomes more heavily contaminated. If this situation is allowed to continue unduly, then the quality of the product degrades. In the present development, the material being forced through the membrane is periodically purged, e.g., one volume of material is purged after every 10 to 1000 volumes of material is processed or a portion of the material is bled off just in advance of the membrane. The material which is bled off or purged will contain an accumulation of contaminants and can be purified by chemical processing or by reverse osmosis as in the invention and then recycled to the primary reverse osmosis membrane for further purification. Interestingly, one of the contaminants which passes through the membrane more readily than the others is long chain mercaptans and these are acidic and removable by alkaline washing, whereas the other contaminants are non-acidic and therefore more resistant to alkaline washing.

A feature of the development is the fact that aqueous liquids are not used in the treatment so that there is no problem of removing treating agents such as alkaline or acidic treating agents or of removing water which is normally used to wash out the treating agent. Indeed, one of the interesting aspects of the invention is the fact that water which may be present as a result of previous aqueous treatments does not pass well through the oleophylic membranes of the invention so that the product of the invention is particularly low in water content which promotes product clarity and subsequent complete combustion.

Returning now to the resins which may be used to constitute the hydrocarbon-insoluble olephylic films and coatings which may be used in the invention, reference is first made to solution addition copolymers of monoethylenically unsaturated materials including at least 30% by weight, preferably at least 50% of long chain ester or ether containing at least four carbon atoms in the terminal hydrocarbon chain. These are illustrated by butyl acrylate or methacrylate, but longer chain esters are more preferred such as 2-ethylhexyl acrylate. Other esters having desirable properties are vinyl hexoate and the ester of allyl alcohol with fatty acids including drying fatty acids, semi-drying fatty acids and non-drying fatty acids. Appropriate ethers are illustrated by the ether of allyl or methallyl alcohol with 2-ethylhexyl alcohol.

A typical copolymer contains by weight 85% 2-ethylhexyl acrylate, 14% of ethyl acrylate and 1% of divinyl benzene. This is copolymerized for 8 hours at reflux in a 30% solution in an equi-weight mixture of xylene and butanol. 1% benzoyl peroxide may be used as catalyst. The product is coated on one surface of a porous block used for reverse osmosis to provide a 1 mil wet thickness and dried for 20 minutes in a 200° F. oven.

The resulting coating is insoluble in gasoline and fuel oil, but these pass through at 100–200 atm. pressure to reduce the concentration of sulfur and other contaminants therein.

Other cross-linking agents which may be used are diallyl succinate 1,4-butylene glycol diacrylate or dimethacrylate and the like. This class of polyethylenically unsaturated cross-linking monomers is well known and is useful in amounts of from 0.5% to 15% to create hydrocarbon insolubility. Of course, the addition polymerization is stopped before gelation with the solvent medium being stronger than the hydrocarbon. Stronger solvents which may be used to increase hydrocarbon insolubility in the film are methyl ethyl ketone or dimethyl sulfoxide which may desirably constitute up to about 20% of the polymerization solvent. Larger amounts, while usable, are not presently preferred. A small amount, from 2–30% of the weight of the solvent may be the hydrocarbon fuel, especially when it is relatively high boiling with respect to the remaining solvents. Upon subsequent low temperature drying, the hydrocarbon fuel remains in the film and preconditions the film to receive the fuel under pressure in the reverse osmosis purification. This is illustrated by a solvent medium constituted by 50% propanol, 30% hexane and 20% gasoline (a mixture of $C_8$–$C_9$ hydrocarbons).

Film insolubilization can also take place by a cross-linking reaction with preformed copolymer. Thus, a copolymer of 85% 2-ethylhexyl acrylate, 13% ethyl acrylate and 2% hydroxy ethyl methacrylate can be formed as described in the previous illustration and its viscosity increased by reaction with organic polyisocyanate, usually the diisocyanate (2,4-toluene diisocyanate) added dropwise until most of the hydroxy group are consumed. In any event, the addition of the diisocyanate cross-linking agent is stopped before the polymer solution gels and films or coatings are formed from the non gelled solution.

Again, small proportions of polyisocyanate, e.g. from 0.5 to 15% by weight of the resin is sufficient to induce hydrocarbon insolubility.

When film insolubilization after deposition is desired, then the diisocyanate can be added and the film deposited before reaction is completed or the diisocyanate can be blocked with phenol, for example, and unblocked after deposition by heat.

Similarly, acidic copolymers containing from 0.5 to 15% of monoethylenic carboxylic acids such as acrylic or methacrylic acids can be used and cured with polyepoxides or diisocyanates and the like.

Fatty acid modified low molecular weight polyesters such as polyesters of glycerin and succinic acid esterified with fatty acids are also useful. These can be insolubilized by reacting, residual hydroxy groups with small amounts of diisocyanates and the like. Most of the available hydroxy groups should be consumed by reaction with the fatty acid to maximize wetting with the hydrocarbon fuel.

Safflower fatty acids are useful in the above, but unsaturated acids such as linseed fatty acids can be used and, here, some degree of air curing can be obtained to further insolubilize the deposited films. Nonetheless, air drying involves oxidation which is not preferred. Using dehydrated castor oil fatty acids, there are hydroxy groups available for cure with diisocyanate added shortly before deposition.

An appropriate polyester is illustrated by cooking a mixture of 3 moles of glycerin with 2 moles of succinic acid and 1 mole of safflower fatty acid. The cooking is continued under conventional esterification conditions, using pressure to avoid volatilization of the low boiling solvents used, to substantial completion, and is carried out in a 40% solids solution of a mixture of 80 parts of hexane, 10 parts of acetone, and 10 parts of gasoline. The cook is continued to an acid number of 15 and then the mixture is cooled to room temperature. A stoichiometric proportion of 2,4-tolylene diisocyanate is added based on the residual acidity and hydroxy functionality in the fatty acid modified polyester and the solution begins to thicken as the curing reaction with the unblocked diisocyanate proceeds. The solution is coated as it thickens upon one surface of a porous block in order to form coated blocks which will cure at room temperature in order to form membranes for the desired hydrocarbon fuel reverse osmosis.

It is desired to point out that room temperature curing is particularly preferred because it minimizes oxidation of the exposed surface of the film and this leads to the best selective wetting by hydrocarbon fuels. It is also preferred when storing the membranes for use in the invention to keep them wetted by hydrocarbon fuels, e.g., they might be stored in a stack with a layer of oil between each sheet in the stack.

The invention is defined in the claims which follow.

I claim:

1. A method of purifying liquid hydrocarbon fuels comprising forcing said fuel under pressure through a hydrocarbon insoluble oleophylic film constituted by a resinous organic solvent-soluble addition copolymer consisting essentially of monoethylenically unsaturated monomers, said copolymer containing at least 50% by weight of monoethylenically unsaturated carboxylic acid ester with the ester group being an alkyl group containing at least four carbon atoms, and said copolymer being rendered insoluble to liquid hydrocarbon by being cross-linked with from 0.5–15% by weight of a cross-linking agent.

2. A method as recited in claim 1 in which said alkyl group contains at least six carbon atoms.

3. A method as recited in claim 1 in which said copolymer is deposited to form said membrane from organic solvent solution.

4. A method as recited in claim 1 in which the addition copolymer is formed by copolymerization in organic solvent solution.

5. A method as recited in claim 1 in which said fuel is gasoline.

6. A method as recited in claim 1 in which said fuel is an oil.

7. A method as recited in claim 1 in which said copolymer is cross-linked with from 0.5–15% by weight of polyethylenically unsaturated cross-linking monomer.

8. A method as recited in claim 1 in which said oleophylic film is a copolymer cross-linked with from 0.5–15% by weight of organic polyisocyanate.

9. A method as recited in claim 1 in which said oleophylic film is swollen with a small proportion of liquid hydrocarbon.

(References on following page)

References Cited

UNITED STATES PATENTS

| | | | |
|---|---|---|---|
| 2,930,754 | 3/1960 | Stuckey | 260—674 |
| 2,960,462 | 11/1960 | Lee et al. | 260—674 |
| 2,985,588 | 5/1961 | Binning | 260—674 |
| 3,043,891 | 7/1962 | Stuckey | 260—674 |
| 3,223,614 | 12/1965 | Paulson | 208—290 |
| 3,305,595 | 2/1867 | Paulson | 208—290 |
| 3,320,328 | 5/1967 | Michaels | 208—290 |
| 3,370,102 | 2/1968 | Carpenter et al. | 208—308 |

DELBERT E. MANTZ, Primary Examiner

G. J. CRASANAKIS, Assistant Examiner

U.S. Cl. X.R.

210—23